(12) United States Patent
Jacob et al.

(10) Patent No.: US 8,737,677 B2
(45) Date of Patent: May 27, 2014

(54) CUSTOMIZED AUDIO CONTENT RELATING TO AN OBJECT OF INTEREST

(75) Inventors: Oren M. Jacob, Peidmont, CA (US); Martin Reddy, San Francisco, CA (US)

(73) Assignee: Toytalk, Inc., San Francisco, CA (US)

( * ) Notice: Subject to any disclaimer, the term of this patent is extended or adjusted under 35 U.S.C. 154(b) by 414 days.

(21) Appl. No.: 13/186,278

(22) Filed: Jul. 19, 2011

(65) Prior Publication Data

US 2013/0022232 A1  Jan. 24, 2013

(51) Int. Cl.
*G06K 9/00* (2006.01)

(52) U.S. Cl.
USPC .......................................... 382/100; 382/181

(58) Field of Classification Search
USPC ................................................ 382/115–118
See application file for complete search history.

(56) References Cited

U.S. PATENT DOCUMENTS

| | | | |
|---|---|---|---|
| 6,773,325 B1 * | 8/2004 | Mawle et al. | 446/175 |
| 7,336,807 B2 * | 2/2008 | Tabata | 382/118 |
| 2002/0029388 A1 | 3/2002 | Heisele | |
| 2002/0102966 A1 * | 8/2002 | Lev et al. | 455/412 |
| 2005/0105769 A1 | 5/2005 | Sloan et al. | |
| 2005/0201565 A1 | 9/2005 | Choi et al. | |

FOREIGN PATENT DOCUMENTS

WO    WO-2005059830 A1    6/2005

OTHER PUBLICATIONS

International Search Report and Written Opinion for International Application No. PCT/US2012/047225 mailed Dec. 26, 2012, 9 pages.

* cited by examiner

*Primary Examiner* — Alex Liew
(74) *Attorney, Agent, or Firm* — Perkins Coie LLP

(57) ABSTRACT

A device/system and method for creating customized audio segments related to an object of interest are disclosed. The device and/or system can create an additional level of interaction with the object of interest by creating customized audio segments based on the identity of the object of interest and/or the user's interaction with the object of interest. Thus, the mobile device can create an interactive environment for a user interacting with an otherwise inanimate object.

37 Claims, 5 Drawing Sheets

CUSTOMIZED AUDIO CONTENT RELATING TO AN OBJECT OF INTEREST

FIELD OF THE INVENTION

At least one embodiment of the present invention pertains to creating customized audio content, and more particularly, to creating customized audio content related to an object of interest identified in an image stream.

BACKGROUND

Children's toys have progressed through the ages. The earliest toys, for example, were made from materials found in nature, such as rocks, sticks, and clay. As civilization progressed toys became more complex. For example, thousands of years ago, Egyptian, Grecian, and Roman children played with dolls that had wigs and movable limbs which were made from stone, pottery, wax, wood, or terracotta.

As technology advanced and civilization continued to progress, toys also changed. Whereas ancient toys were made from materials found in nature like stone, wood, and grass, modern toys are often made from plastic, cloth, and synthetic materials. Ancient toys were often made by the parents and family of the children who used them, or by the children themselves. Modern toys, by contrast, are often mass-produced and sold in stores.

This change in the nature of toys is exemplified by the advancements that have taken place in creating interactive toys. For example, dolls, one of the oldest and most universal of human toys dolls, have become increasingly interactive. The earliest and most primitive dolls were simple wooden carvings or bundles of grass. Egyptian dolls were sometimes jointed so that their limbs could move realistically. By the early 19th century there were dolls that could say "mama". Today there are computerized dolls that can recognize and identify objects, the voice of their owner, and choose among hundreds of pre-programmed phrases with which to respond.

However, current technology does not provide for customized audio segments to be dynamically created in response to recognizing an identity of a random toy and/or a user's interaction with the toy or other object of interest.

SUMMARY

The techniques introduced here provide for an interactive environment including customized audio segments related to an object of interest created in response to a user's interaction with the object of interest. The techniques include capturing a stream of images that includes the object of interest and locating the object of interest in an image of the image stream. The techniques further include identifying the object of interest and associating the object of interest with an object profile that includes an audio profile and an image profile. The techniques introduced here further provide for creating customized audio segments that are related to the object of interest.

The techniques introduced here further provide for a user to create an object profile for an object of interest. Creation of the object profile includes associating the object of interest with an audio profile and an image profile. The audio profile can be constructed by selecting from a collection of pre-recorded audio profiles, recording audio clips to create the audio profile, selecting a crowd-sourced audio profile, and/or using a computer generated audio profile.

In one embodiment, a mobile device, using the techniques introduced here, can create an additional level of interaction with the object of interest by creating customized audio segments based on the identity of the object of interest and/or the user's interaction with the object of interest. Thus, the mobile device can create an interactive environment for a user interacting with an otherwise inanimate object.

Other aspects of the techniques summarized above will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements.

DETAILED DESCRIPTION

References in this specification to "an embodiment", "one embodiment", or the like, mean that the particular feature, structure or characteristic being described is included in at least one embodiment of the present invention. Occurrences of such phrases in this specification do not necessarily all refer to the same embodiment.

Figure 1:
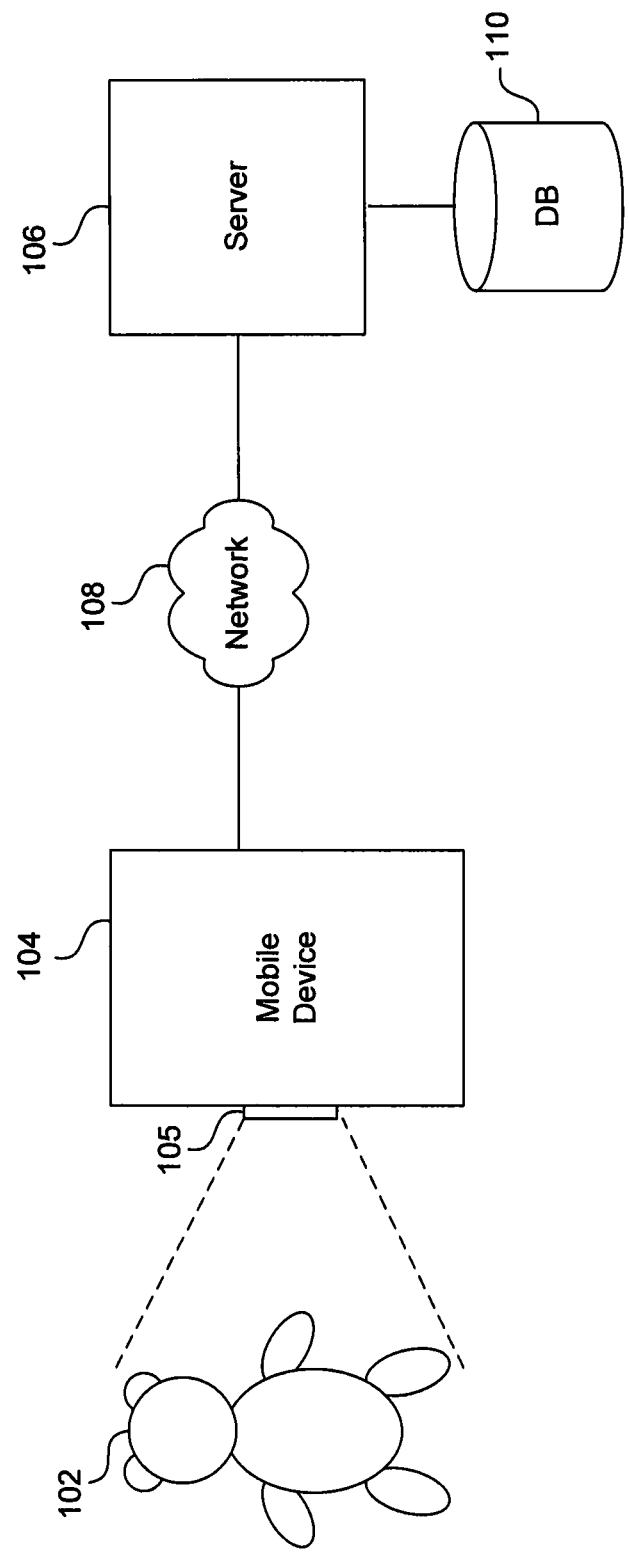
FIG. 1 is a block diagram of an example system for creating customized audio content relating to an object of interest.

FIG. 1 is a block diagram of an example system for creating customized audio content relating to an object of interest. In the example embodiment of FIG. 1, the system includes a mobile device 104 coupled with a server 106 through a network 108. While functions performed according to the techniques introduced here may be described as being performed by either the mobile device 104 or the server 106, it will be apparent that the functions can be performed by the mobile device 104 or the server 106 alone or in combination. The mobile device 104 includes a camera 105 to capture a stream of images that include an object of interest 102.

As described in more detail below, the mobile device 104 can send an image from the image stream captured by the camera 105 to the server 106 for processing. In another embodiment, the mobile device 104 can process the image itself. The server 106 is coupled with a storage device 110 that stores audio clips, image profiles, etc. that the server can use to identify an object of interest 102 and create a customized audio segment related to the object of interest 102. The process for creating the customized audio segment is described in more detail below with reference to FIG. 4.

Figure 2:
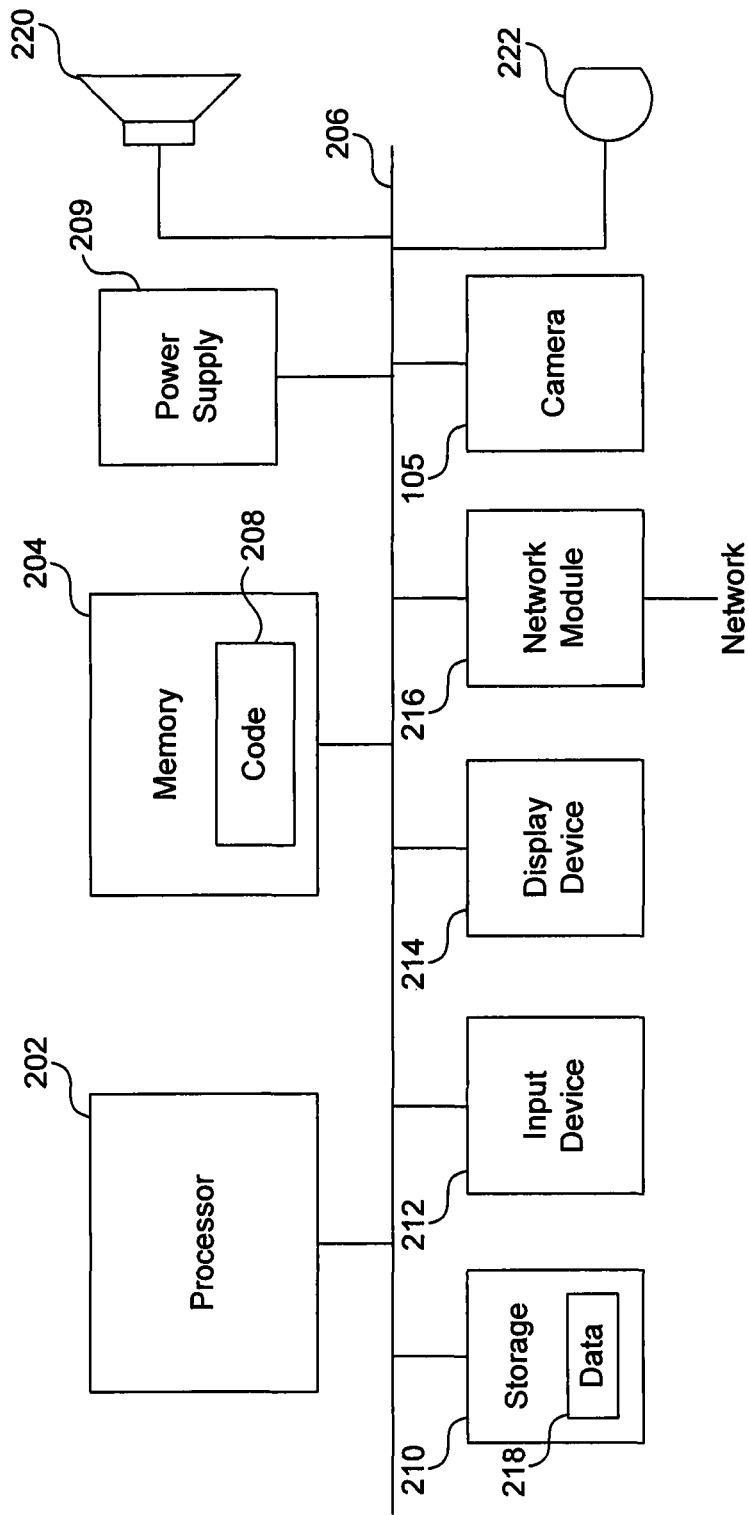
FIG. 2 is a block diagram of an example mobile device.

FIG. 2 is a block diagram of an example mobile device that can be used to implement some or all of the techniques introduced here. The mobile device described here is an illustration of one type of mobile device in which the techniques can be implemented; other mobile devices may also be used for implementing the techniques. For example, mobile devices may include cell phones, personal digital assistants (PDAs), portable email devices (e.g., a Blackberry® device), portable media players (e.g., an Apple iPod Touch®), tablet or slate computers (e.g., an Apple iPad®), netbook computers, notebook computers, e-readers, or any other similar device. While the description here is directed to a mobile device, one of ordinary skill would recognize that the process could be performed by a larger computing device, for example a desktop computer, a game console (e.g., Microsoft XBox® or Sony PS3®), or a television/set-top box with sufficient audio and video processing capabilities.

In the example of FIG. 2, the device is a processing system that includes a processor subsystem 202 that can include one or more processors. The device further includes a memory 204, a storage module 210, an input device 212, a display device 214, and a network module 216 (e.g., an antenna system to connect to a wireless network) each interconnected by an interconnect 206 and powered by a power supply 209. In one embodiment, the power supply is an external power supply. The device includes a speaker 220, a microphone 222, and a camera 105.

The display device 214 is configured to display information for viewing. Information for display can consist of textual, graphical, and/or multimedia information and is presentable in a graphical user interface. In some embodiments, the display 214 includes a touch-sensitive screen that allows for the direct manipulation of displayed information. In some embodiments, the displayed information can be manipulated by the input device 212. The input device 212 is configured to produce a signal based on user input. The input device 212 can be, for example, a keyboard, mouse, trackball, touch-sensitive screen, or any other input device capable of communicating a user selection. The signal may include a user selection that conveys the user input to the processor subsystem 202, via the interconnect 206.

The memory 204 illustratively comprises storage locations that can be addressed by the processor subsystem 202 and the devices other components for storing software program code and data structures associated with the present invention. The processor subsystem 202 and the associated components may, in turn, include processing elements and/or logic circuitry configured to execute the software code and manipulate the data structures. The code 208, portions of which are typically resident 204 in memory and executed by the processor subsystem 202, implements the communication operations according to the techniques introduced here. It will be apparent to those skilled in the art that other processing and memory implementations, including various computer readable storage media, may be used for storing and executing program instructions pertaining to the techniques introduced here.

Figure 3:
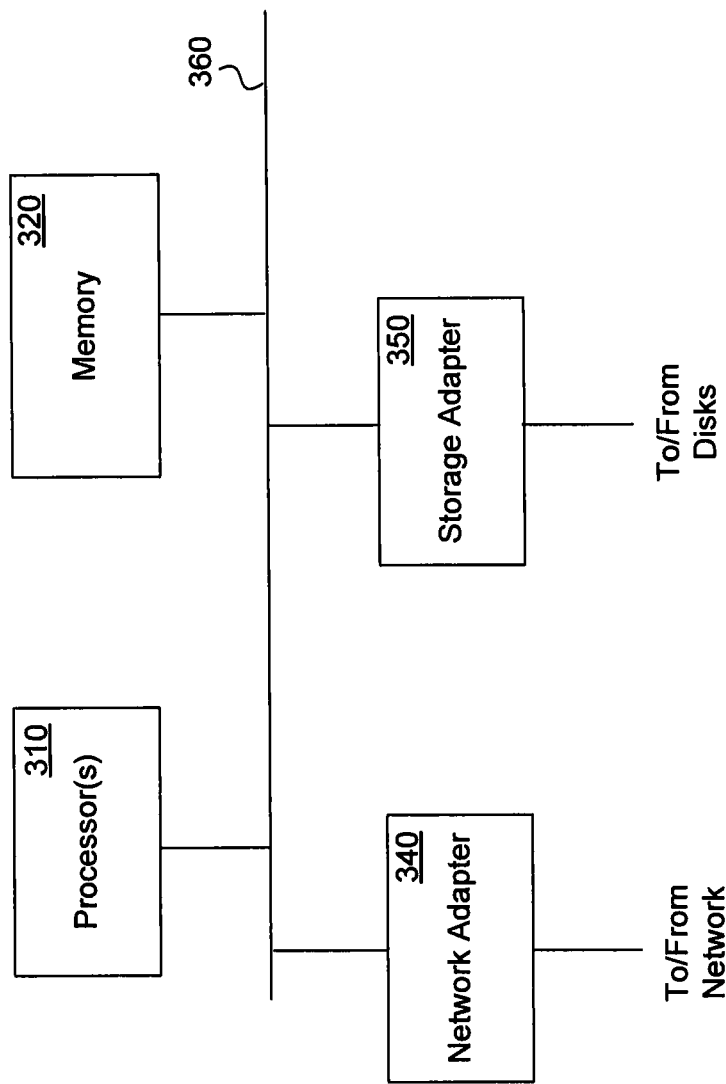
FIG. 3 is a block diagram of an example server system.

FIG. 3 is a block diagram of an example server system. In an illustrative embodiment, the server system 106 includes a processor subsystem 310 that includes one or more processors. The server system 106 further includes memory 320, a network adapter 340, and a storage adapter 350, all interconnected by an interconnect 360.

The memory 320 illustratively comprises storage locations that are addressable by the processor(s) 310 and adapters 340 and 350 for storing software program code and data associated with the techniques introduced here. The processor 310 and adapters 340 and 350 may, in turn, comprise processing elements and/or logic circuitry configured to execute the software code and manipulate the data structures. It will be apparent to those skilled in the art that other processing and memory implementations, including various computer readable storage media, may be used for storing and executing program instructions pertaining to the techniques introduced here.

The network adapter 340 includes a plurality of ports to couple the server system 106 with one or more other systems over point-to-point links, wide area networks, virtual private networks implemented over a public network (Internet) or a shared local area network. The network adapter 340 thus can include the mechanical components and electrical circuitry that allows the server system 106 to connect with the mobile device 104 over the network 108. One or more server systems can communicate with other systems, such as the mobile device 104, by exchanging messages, for example, using packets or frames of data according to pre-defined protocols.

The storage adapter 350 cooperates with the operating system to access information on attached storage devices, such as storage device 110. The information may be stored on any type of attached array of writable storage media, such as magnetic disk or tape, optical disk (e.g., CD-ROM or DVD), flash memory, solid-state drive (SSD), electronic random access memory (RAM), micro-electro mechanical and/or any other similar media adapted to store information, including data and parity information. The storage adapter 350 includes a plurality of ports having input/output (I/O) interface circuitry that couples with the storage device over an I/O interconnect arrangement. In one embodiment, remote storage devices can be used to supplement and/or replace local storage. The system can connect to the remote storage devices using network adapter 340 or a specialized storage adapter (e.g., to connect to cloud-based storage systems like Amazon S3).

Figure 4:
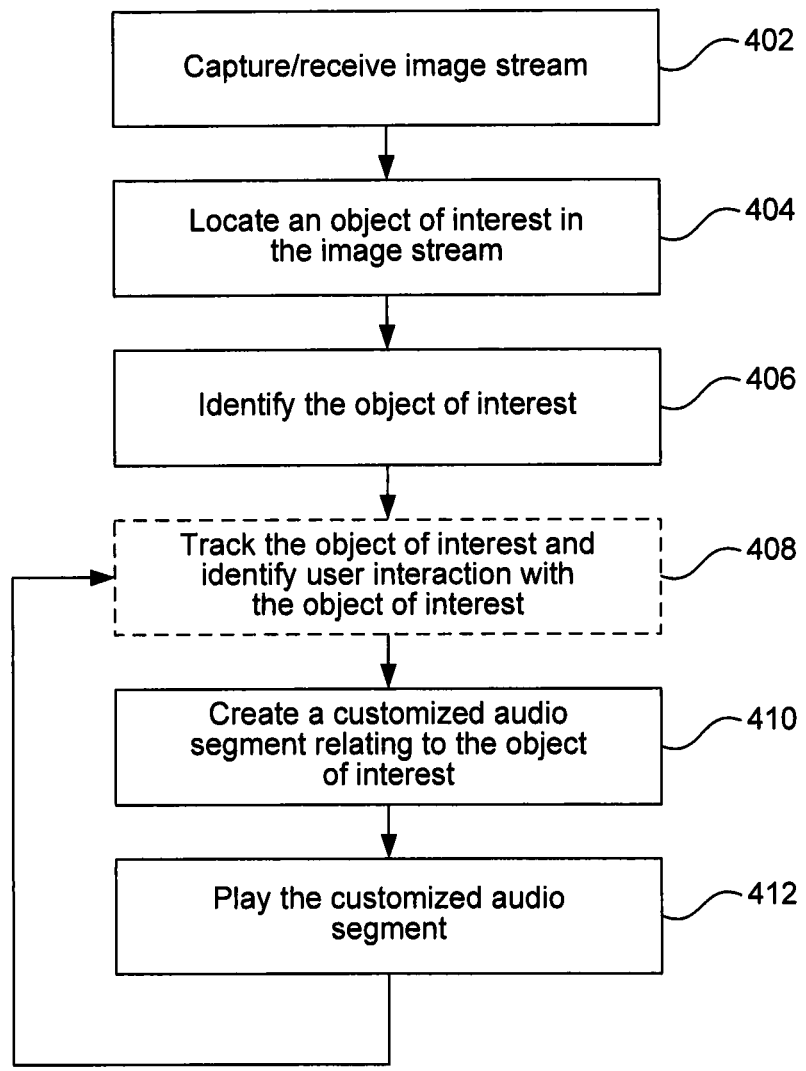
FIG. 4 is a flow diagram of a process for creating customized audio content relating to an object of interest.

FIG. 4 is a flow diagram of a process for creating customized audio content relating to an object of interest. In one embodiment, the object of interest 102 is a toy that a user is playing with. The mobile device 104, using the techniques introduced here, can create an additional level of interaction with the toy by creating customized audio segments based on the identity of the toy and/or the user's interaction with the toy. Thus, the mobile device 104 can create an interactive environment for a child playing with the otherwise inanimate toy.

The process begins at step 402 with the camera 105 of the mobile device 104 capturing a stream of images that include the object of interest 102. In one embodiment, the mobile device 104 transmits the image stream to the server 106 over network 108. In another embodiment, the image stream can be processed locally by the mobile device 104.

At step 404, after capturing the image stream, the mobile device 104 locates the object of interest 102 in the image stream. The mobile device 104 can locate the object of interest 102 in the image stream by tracking a user's interactions with an object in the image stream and determining based on the user's interactions that the object is an object of interest 102, for example. In other examples, the user can perform a certain specified motion with the object of interest 102 that the mobile device 104 can detect, such as moving the object in an up-and-down or side-to-side motion. In yet another example, the mobile device 104 can locate the object of interest 102 through a user's interaction with the mobile device 104 (e.g., the user can use the touch-sensitive screen or other input device 212 of the mobile device 104 to select the object of interest 102 from the image stream or the user can provide the mobile device 104 with a spoken command to initiate an automated process for locating the object of interest 102). Further examples include the mobile device 104 automatically locating the object of interest 102 using computer vision.

Once the mobile device 104 has located the object of interest 102 in the image stream, at step 406, the mobile device 104 can identify the object of interest 102. In another embodiment, the mobile device 104 can send an image from the image stream to the server 106 for the server 106 to identify the object of interest 102. Identifying the object of interest 102 can be performed using any one of a number of known image recognition algorithms. Continuing with the example from above where the object of interest 102 is a toy, the mobile device 104 can identify the toy as a popular television/movie character. In one embodiment, multiple objects of interest in the image stream can be located and identified.

Figure 5:
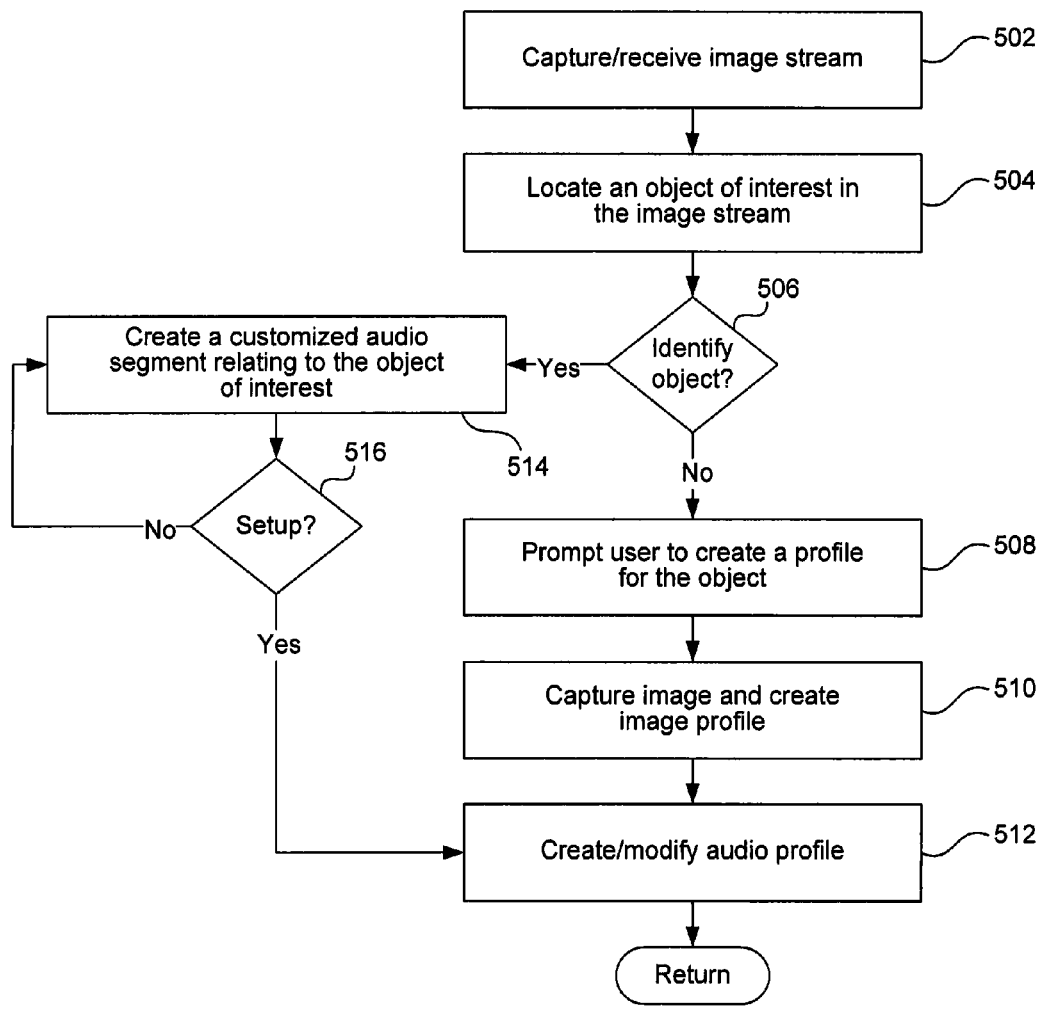
FIG. 5 is a flow diagram of a process for creating an object profile for an object of interest.

However, the techniques introduced here are not limited to a database of popular toys based on television/movie characters. In one embodiment, an object profile can be created for any object that a user is interacting with. For example, a user can create an object profile for a drawing that the user has made, a less popular toy that may not be included in a database of popular toys, another human, or any other regular household item (e.g., a blender, a piece of fruit, a mop, etc.). Further, if the mobile device 104 is not able to identify the object of interest 102, the user may be prompted to create an object profile for the object of interest 102. The process for creating and/or updating the object profile of an object of interest is described in more detail below with reference to FIG. 5.

In one embodiment, after the mobile device 104 has identified the object of interest 102, at step 408, the mobile device 104 can optionally track the object of interest 102 and the user's interaction with the object of interest 102. Continuing the example of a child playing with a toy, the mobile device 104, using the microphone 222 along with the camera 105, can capture how the child is playing with the toy and base future processing, for example, creating customized audio segments based on the child's interaction with the toy. For example, if the mobile device 104 detects that the child is pretending that the toy is flying, the mobile device 104 can create a customized audio segment that expresses the toy's actions and/or possible emotions. In another embodiment, the customized audio segments can be created based on spoken or typed user input. In one embodiment, the mobile device detects the user's emotion in speaking the input and the customized audio segment is created based, at least in part, on the user's emotion.

After the object of interest 102 has been identified, and in some examples the user's interaction with the object has been tracked, the mobile device 104, at step 410, creates a customized audio segment related to the object of interest 102. The customized audio segment, in some examples, is created by compiling a plurality of audio clips into the customized audio segment. The audio clips can be, for example, licensed audio clips, user recorded audio clips, crowd-sourced audio clips, and/or computer generated audio clips. Thus, the customized audio segments can be dynamically created to correspond to any number of situations based on the identity of an object of interest, a user's current interaction with the object of interest, and/or the history of a user's interactions with the object of interest. In one embodiment, where there are multiple objects of interest present in the image stream, customized audio segments for each of the objects of interest can be created to simulate conversation/interaction between the objects of interest.

In the example of a child playing with a popular toy based on a television/movie character, the licensed audio clips can be in the voice of the character. In one embodiment, the licensed audio content can be paid for by the user at the time a toy is recognized and associated with the licensed audio content. In another embodiment, the price of the licensed content can be included in the overall cost of the software and/or hardware implementing the techniques introduced here. Otherwise, a parent, child, and/or a larger community of users can record their own audio clips that can be stored and later compiled by the mobile device 104 into the customized audio segment. In one embodiment, the mobile device 104 stores in a local memory audio clips of interjections, for example, "uh", "um", and the like, that can be played while the mobile device 104 creates the customized audio segments.

At step 412, after the mobile device 104 has created the customized audio segment and/or an interjection has stopped playing, the mobile device 104 can play the customized audio segment. The process of creating and playing customized audio segments based on user interaction with the object of interest can be a continuous process as shown in FIG. 4. As described above, the process is organized as a sequence of operations in the flowchart. However, it should be understood that in this process, and the other processes described herein, at least some of the operations associated with the process potentially can be reordered, supplemented, or substituted for, while still performing the same overall technique.

As described above, the database of objects of interest is not likely to be all encompassing and many objects of interest will not be initially included. Thus, a method for creating an object profile, including an audio profile and an image profile, for an object of interest is now described with reference to FIG. 5. The process begins with step 502, where the camera 105 of the mobile device 104 captures a stream of images. Capturing the stream of images is described in more detail above with reference to FIG. 4. The process continues, at step 504, with the mobile device 104 locating the object of interest 102 similar to the description above.

As described above, once the object of interest 102 has been located, at step 506 the mobile device 104 attempts to identify the object of interest 102 as an object that has an object profile already created. If the mobile device 104 is not able to identify the object of interest 102, at step 508, the mobile device 104 prompts the user to begin a setup process to create an object profile for the object. In one embodiment, the prompts can be audio prompts. For example, if the mobile device 104 detects a child playing with a toy that the mobile device 104 is not able to recognize, the mobile device 104 can pose a question, such as "What are you playing with?", to the child to initiate the setup process. In another embodiment, the setup prompt can be a popup on the display 214 of the mobile device 104.

In one embodiment, at step 510, the mobile device 104 can prompt the child to hold the toy up so that the mobile device 104 can capture a clear image of the object. The mobile device 104 can use image processing software to build an image profile of the toy so that the toy can be recognized in later interactions. It is understood that at any point during the setup process, if the mobile device 104 is able to recognize the object of interest 102 as an object that already has an object profile created, the setup process can be ended and the mobile device 104 can begin to create customized audio segments related to the identified object of interest 102.

Once the mobile device 104 has created an image profile for the object of interest 102, at step 512, the mobile device 104 can create an audio profile for the object. In one embodiment, creating an audio profile can include prompting the user, for example, the child playing with the toy or a parent of the child, to record audio clips that can be used to create the customized audio segment. In another embodiment, the mobile device 104 can prompt the user to select a pre-recorded set of audio clips to associate with the object. For example, if a child is pretending that a toy is a particular character from a movie or television, the child, or a parent, can select a licensed audio package that is in the voice of that character. In another embodiment, the mobile device 104 can select a generic audio package that fits the characteristics of the toy, for example, a soft, cuddly voice for a teddy bear. In yet another embodiment, the user or the mobile device 104 can associate the toy with a computer generated voice that can be used to create the customized audio segments. In one embodiment, the audio profile can be created separately from, and later linked to, an object profile that is created by the user.

The information that is gathered and/or created during the setup process, for example, the image profile, recorded audio clips, or the like, can be stored by the mobile device 104 in storage 210 for use in creating customized audio segments. In another embodiment, the information can be stored in the storage 110 coupled with server 106 and accessed by the mobile device 104 over network 108.

If, at step 506, the mobile device 104 can identify the object of interest 102, the process continues, at step 514, with creating customized audio segments as described above with reference to FIG. 4. However, at any time while creating the customized audio segments, the user can initiate the setup process. At step 516, as long as the user does not initiate the setup process, for example, by a verbal command or interaction with the display 214 and/or input device 212, the customized audio content creation process, step 514, continues. However, in response to a user's command to enter setup, at step 516, the mobile device 104 allows the user to create new and/or modify existing audio content related to the object of interest 102.

The techniques and elements introduced above can be implemented by programmable circuitry programmed or configured by software and/or firmware, or they can be implemented by entirely by special-purpose "hardwired" circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc. Further, the term "processor" encompasses all kinds of apparatus, devices, and machines for processing data, including by way of example a programmable processor, a computer, a system on a chip, or multiple ones, or combinations, of the foregoing.

Software or firmware for use in implementing the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc. Moreover, while machine-readable storage medium is not a propagated signal, a machine-readable storage medium can be a source or destination of computer program instructions encoded in an artificially-generated propagated signal.

The term "logic", as used herein, can include, for example, special-purpose hardwired circuitry, software and/or firmware in conjunction with programmable circuitry, or a combination thereof.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network.

The computing system can include any number of clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

The invention claimed is:

1. A method comprising:
capturing, by a camera of a mobile device, at least one image including a toy;
transmitting the at least one image to a server;
receiving, in response to transmitting the at least one image to the server, a customized audio segment relating to the toy;
playing, by the mobile device, the customized audio segment;
locating a second object of interest in the object stream;
identifying the second object of interest;
creating a second customized audio segment, such that the customized audio segment and the second customized audio segment simulate a conversation between the object of interest and the second object of interest; and
playing the second customized audio segment.

2. The method of claim 1 further comprising:
locating the toy in the at least one image;
detecting, by the mobile device, an identity of the toy; and
transmitting the identity of the toy to the server.

3. The method of claim 2, wherein the customized audio segment is related to the identity of the toy.

4. The method of claim 1, wherein a plurality of pre-recorded audio segments are compiled to form the customized audio segment.

5. The method of claim 2, wherein locating the toy in the at least one image includes receiving, from a user, an indication that an object in the at least one image is the toy.

6. A method comprising:
receiving, at a server from a mobile device, at least one image including an object of interest;
creating a customized audio segment relating to the object of interest; and
transmitting the customized audio segment to the mobile device.

7. The method of 6 further comprising:
locating the object of interest in the at least one image; and
detecting an identity of the object of interest.

8. The method of claim 7, wherein creating a customized audio segment includes, compiling stored audio clips into the customized audio segment based on the identity of the object of interest.

9. The method of claim 7 further comprising:
receiving a user indication of the object of interest in the at least one image, wherein locating the object of interest is based on the user indication.

10. The method of claim 6, wherein the object of interest is a toy.

11. The method of claim 6, wherein the object of interest is a human.

12. The method of claim 6, wherein the object of interest is a regular household item.

13. A method comprising:
capturing, by a camera of a mobile device, a video stream including an object of interest;
locating the object of interest in the video stream;
identifying the object of interest;
creating a customized audio segment based on an identity the object of interest;
playing the customized audio segment;
locating a second object of interest in the object stream;
identifying the second object of interest;
creating a second customized audio segment, such that the customized audio segment and the second customized audio segment simulate a conversation between the object of interest and the second object of interest; and
playing the second customized audio segment.

14. The method of claim 13 further comprising, playing additional customized audio segments for the object of interest based on further user interactions.

15. The method of claim 14, wherein the further user interactions include text or voice input.

16. The method of claim 14, wherein the further user interactions include physical motion of the user, the object of interest, or the mobile device.

17. The method of claim 14, wherein the further user interactions include emotions expressed by the user that are subsequently detected by the mobile device.

18. The method of claim 13, wherein the customized audio segment is generated, at least in part, based on a history of user interaction with the object of interest.

19. The method of claim 13, wherein the customized audio segment is generated based on a plurality of objects of interest.

20. The method of claim 13, wherein creating a customized audio segment includes, compiling stored audio clips into the customized audio segment based on the identity of the object of interest.

21. The method of claim 13, wherein the customized audio segment is related to the identity of the object of interest.

22. The method of claim 13, wherein locating the toy in the at least one image includes receiving, from a user, an indication that an object in the at least one image is the object of interest.

23. The method of claim 13 further comprising, recording a plurality of audio clips, wherein creating a customized audio segment includes compiling a set of the plurality of audio clips into the customized audio segment.

24. The method of claim 13 further comprising, playing an interjection audio clip while the customized audio segment is being created.

25. A system comprising:
a processor; and
a memory coupled with the processor, the memory storing instructions which when executed by the processor cause the system to perform a plurality of operations, including:
receiving at least one image including an object of interest;
locating the object of interest in the at least one image;
identifying the object of interest;
creating a customized audio segment based on the identity the object of interest; locating a second object of interest in the object stream;
identifying the second object of interest;
creating a second customized audio segment, such that the customized audio segment and the second customized audio segment simulate a conversation between the object of interest and the second object of interest; and
playing the second customized audio segment.

26. The system of claim 25 wherein the plurality of operations further includes, playing the customized audio segment.

27. The system of claim 25 further comprising, a user interface configured to display the at least one image and detect a user input wherein, locating the object of interest in the at least one image includes detecting a user input that indicates an object in the at least one image is the object of interest.

28. The system of claim 25 further comprising, a storage device configured to store a plurality of audio clips, wherein creating the customized audio segment includes compiling a set of the plurality of audio clips into the customized audio segment.

29. The system of claim 25 further comprising:
a microphone configured to receive a plurality of audio clips; and
a storage device to store the plurality of audio clips, wherein creating the customized audio segment includes compiling a set of the plurality of audio clips into the customized audio segment.

30. A method comprising:
receiving at least one image including an object of interest;
locating the object of interest in the at least one image;
identifying the object of interest;
creating a customized audio segment based on the identity the object of interest;
locating a second object of interest in the object stream;
identifying the second object of interest;
creating a second customized audio segment, such that the customized audio segment and the second customized audio segment simulate a conversation between the object of interest and the second object of interest;
playing the second customized audio segment; and
playing an interjection audio clip while the customized audio segment is being created.

31. The method of claim 30, wherein creating a customized audio segment includes, compiling stored audio clips into the customized audio segment based on the identity of the object of interest.

32. The method of claim 30, wherein the customized audio segment is related to the identity of the object of interest.

33. The method of claim 30, wherein locating the toy in the at least one image includes receiving, from a user, an indication that an object in the at least one image is the object of interest.

34. The method of claim 30 further comprising, recording a plurality of audio clips, wherein creating a customized audio segment includes compiling a set of the plurality of audio clips into the customized audio segment.

35. The method of claim 30 further comprising, playing the customized audio segment.

36. The method of claim 30, wherein the customized audio segment is generated by a mobile device at run time.

37. The method of claim 30, wherein the customized audio segment is generation by a server at run time and transmitted to a mobile device.

* * * * *